Patented Aug. 2, 1949

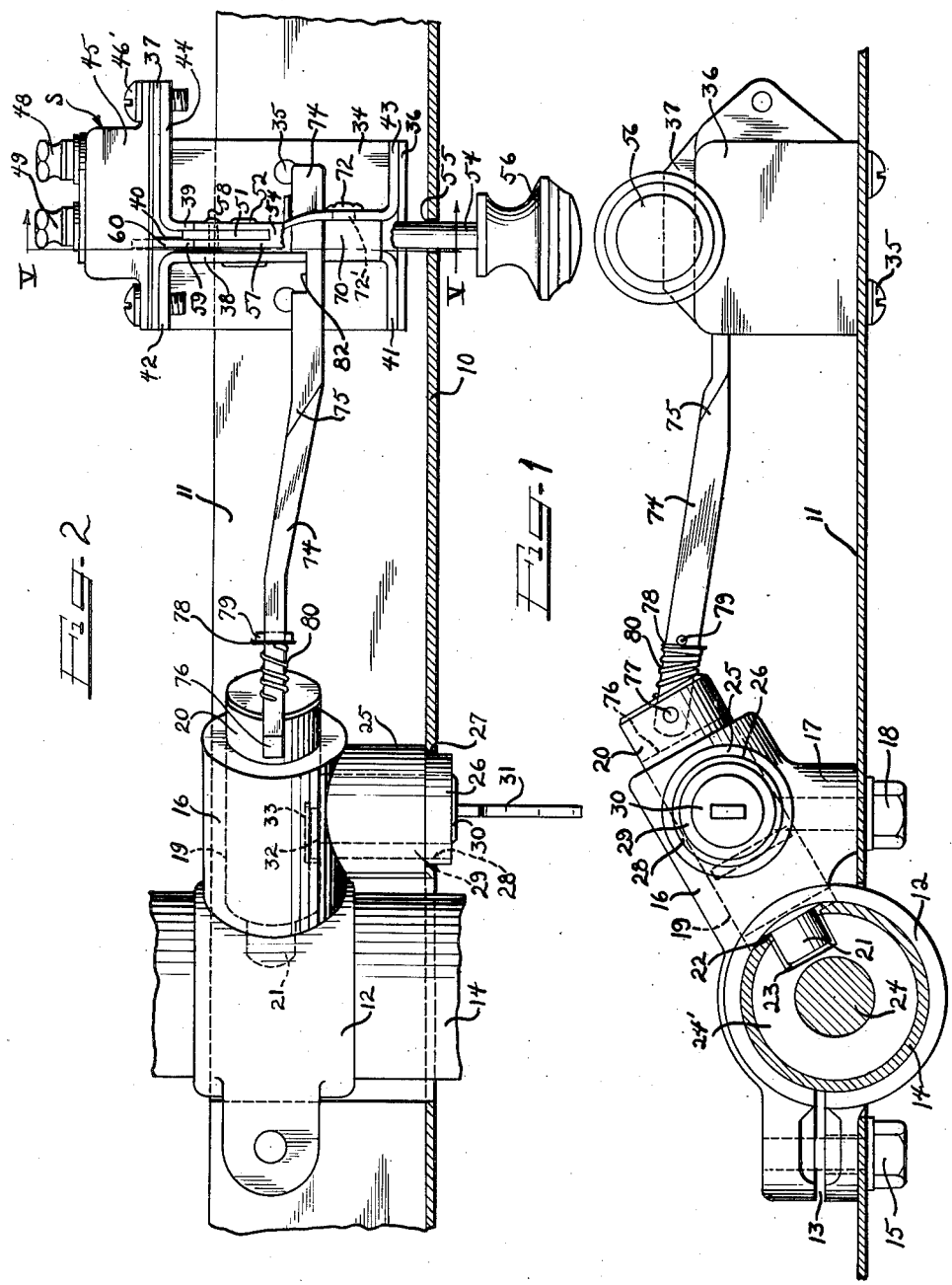

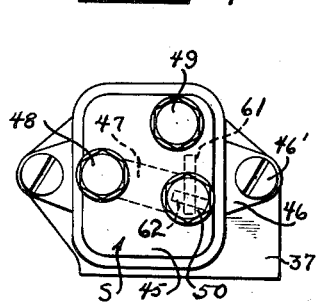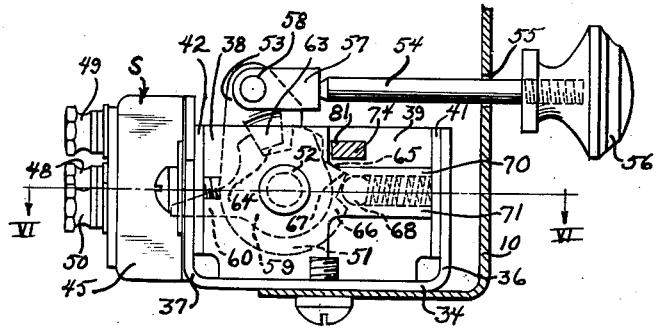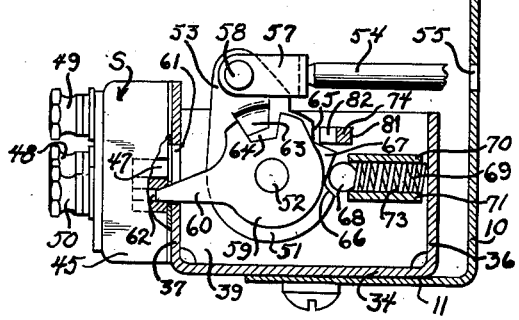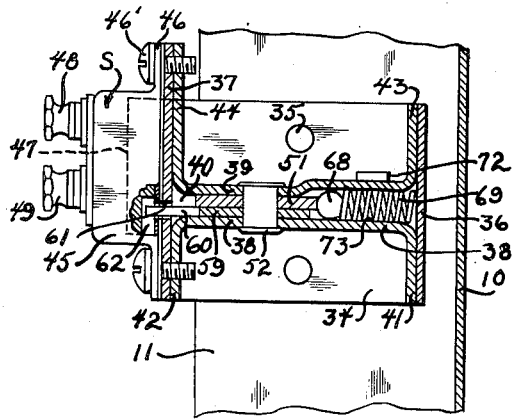

2,478,016

UNITED STATES PATENT OFFICE 2,478,016

SWITCH STRUCTURE AND STEERING COLUMN LOCK

Ray A. Sandberg, Waukegan, Ill., assignor to Houdaille-Hershey Corporation, Detroit, Mich., a corporation of Michigan Original application October 26, 1944, Serial No. 560,502, now Patent No. 2,412,752, dated December 17, 1946. Divided and this application November 10, 1945, Serial No. 627,924

6 Claims. (Cl. 70—252)

This invention relates to ignition and steering locking assembly for automotive vehicles and particularly to an assembly in which a locking unit and a switch unit are remote from each other and mounted on and behind the instrument panel with only the key-operable lock barrel for the steering lock and the manually operable button for the switch unit visible to the driver in front of the panel.

An important object of the invention is to provide an improved switch unit which may be readily mounted on the ledge of an instrument panel behind the panel front wall with the switch control button accessible from the front of the panel, and to provide a steering locking unit also mountable on the ledge of the panel behind the panel front and with the lock barrel for operation of the steering locking bolt accessible for key insertion from the front of the panel.

A further object is to provide interconnection between the locking unit and the switch unit which will readily permit desired positioning of the switch unit relatively to the locking unit and which will function for intercontrol of the lock unit and switch unit so that operation of the switch button for ignition circuit closure will be prevented while the steering is locked, and relocking of the steering will be prevented while the switch button is set for closure of the ignition circuit.

The above referred to and other features of the invention are embodied in the structure shown on the drawings in which:

Figure 1 is a front elevation of the ignition steering locking assembly mounted on the instrument panel which is partly in section and partly broken away;

Figure 2 is a plan view of the assembly;

Figure 3 is a side elevation of the switch unit;

Figure 4 is an end elevation of the switch unit;

Figure 5 is a section on plane V—V Figure 2;

Figure 6 is a section on plane VI—VI Figure 3.

On the drawings, 10 indicates the instrument panel which at its lower end is deflected rearwardly to provide a ledge or lip 11. The steering locking unit comprises the collar 12 split at 13 for receiving the steering column 14 to be rigidly clamped thereto by contraction of the collar by the screw 15. The clamping collar is at one end of a cylindrical body 16 which extends diagonally upwardly therefrom at the right thereof above the panel ledge 11, a boss 17 extending down from the body to seat against the ledge. A screw 18 extends through the ledge and threads into the boss 17 to secure the body 16 of the lock unit to the ledge. The clamping screw 15 also extends through the panel ledge so that the clamping screw, besides functioning to clamp the collar 12 to the steering column, will assist the screw 18 in holding the lock structure in place on the panel ledge, as shown on Figure 1.

A bore 19 extends through the body 16 and a lock bolt 20 is axially movable in the bore and has the locking end 21 for extending through the opening 22 in the steering column 14 for engagement in the locking recess 23 in the collar 24' on the steering shaft 24 which extends through the steering column, this steering shaft at its upper end terminating in a steering wheel (not shown) in a manner well known in the art.

The locking unit body 16 has a forward extension 25 terminating in a neck 26 which extends through an opening 27 in the vertical wall 10 of the instrument panel. This extension 25 has the bore 28 therethrough communicating with the bore 19. In the bore 28 is secured the tubular lock frame 29 which receives the tumbler lock barrel 30 operable by a suitable key 31. This lock barrel at its inner end carries a cam 32 which engages in a slot 33 provided in the lock bolt 20, so that when the key is turned the lock bolt may be shifted outwardly to withdraw its locking end 21 from the steering shaft 24 or shifted inwardly for engagement of its locking end 21 in the notch 23 of the steering shaft collar to thus lock the steering shaft against operation.

The ignition switch unit is constructed substantially entirely of sheet metal parts. It comprises a main supporting frame 34 of U-shape for seating on the panel ledge 11 to which it may be secured, as by spot welding, or detachably secured as by means of screws 35. Extending between the front and rear walls 36 and 37, respectively, of the frame 34 are the parallel cross walls 38 and 39 separated by a space 40. The front and rear end portions 41 and 42 of the wall 38 are deflected laterally at right angles and are secured respectively to the front and rear walls 36 and 37 of the frame 34, preferably by spot welding. The front and rear portions 43 and 44 of the wall 39 are deflected laterally at right angles and secured to the front walls 36 and 37 of the frame 34, preferably by welding.

Mounted on the outer side of the rear wall 37 of the frame 34 is a switch S. The switch comprises a housing 45 having ears 46 by which it may be secured to the outer side of the wall 37 as by screws 46'. Within the switch housing is a switch arm 47 pivoted at one end for electrical engagement with a terminal post 48 to be swung for selective engagement with terminal posts 49 and 50. The terminal post 48 is usually connected with a source of current such as a battery, while the post 49 would be connected with the ignition circuit, the post 50 being connected with some auxiliary electrical circuit.

In the space 40 between the cross walls 38 and 39 is the mechanism for operating the switch S. This mechanism includes a sheet metal operating lever 51 having a disk shape body fulcrumed on a pin 52 with its arm 53 extending upwardly beyond the space 40 to which the inner end of a stem 54 is pivoted, which stem extends forwardly through an opening 55 in the panel 10 with a button 56 secured thereto whereby the stem may be axially shifted for rocking of the lever 51. As shown, the bifurcated inner end 57 of the stem receives the arm 53 pivoted thereto by a pin 58.

Rotatable on the pin 52 between lever 51 and wall 38 is a switch setting disk 59 which has a finger 60 extending radially rearwardly therefrom for projection through a slot 61 in the rear wall 37 of the frame 34. This finger extends into the switch housing 45 for engagement in the recess 62 in the outer end of the switch arm 47, so that, upon rocking of the disk 59, the switch arm may be selectively moved for connection with the terminal posts 49 and 50.

The arm 53 of the operating lever 51 has a tongue 63 deflected therefrom into the plane of the disk 59, and this tongue engages in a slot 64 in the disk 59, the slot being wider than the tongue to provide a lost motion connection. In its front edge, the lever body 51 has notches 65 and 66 with a tooth 67 therebetween. A ball 68 is forced by a spring 69 against the edge of the lever body for engagement with the side edges of the tooth 67. With the arrangement shown, when the switch button 56 is manipulated, the lever and disk will be given an over-center or snap action for snap operation of the switch. The drawings show the switch button having been moved in for engagement of the tongue 63 with the rear side of the notch 64 for counter-clockwise rocking of the lever and disk to swing the finger 60 down for setting of the switch arm 47 into engagement with the terminal post 50. During this inward movement of the button, the tooth 67 on the lever 51 was carried past the ball 68 against the resistance of the spring 69 until the ball came into engagement with the lower inclined edge of the tooth 67 whereupon the pressure of the ball by the spring against this edge caused the lever and disk to be snapped into position for setting of the switch arm for engagement with the terminal 50. Now, when the button 56 is pulled out from the position shown, the lever 51 will be rotated clockwise against the pressure of the ball until the tongue 63 engages with the forward edge of the notch 64 for rotation of the disk with the lever whereafter the tooth 67 will move down past the ball and the ball will be pressed against the top inclined edge of the tooth 67 to then rapidly rock the lever and disk for upswing of the finger 60 and setting of the switch arm 47 into engagement with the switch terminal 49. When the button is now pushed back in, the lever will be momentarily rocked counter-clockwise against the pressure of the ball until the tongue 63 engages the rear edge of the notch 64 in the disk 59, whereafter the ball will pass the tooth 67 and will engage with the inclined lower edge of the tooth to quickly snap both lever and disk to their final counter-clockwise movement for down-swing of the finger 60 to snap the switch arm 74 back into engagement with the terminal 50. When the button 56 is in, the auxiliary circuit connected with the terminal 50 will be connected with the battery, and when the button 56 is pulled out for engagement of the switch arm with the terminal 49, the ignition circuit will be in connection with the battery. After each inward or outward setting of the button 56, the switch structure will be held in such set position by the pressure of the ball 68.

I have provided a simple arrangement for housing the ball 68 and the spring 69. At its front end the sidewall 38 is cut transversely from its upper and lower edges to leave upper and lower rectangular portions 70 and 71 which are deflected laterally toward the right to abut against the cross-wall 39, tongues 72 being left on the ends of the deflected walls to extend through slots 72' in the wall 39, the ends of the tongues being riveted over or otherwise secured to the wall 39. The walls 70 and 71 together with the wall 39 thus form a rectangular chamber 73 for the ball 68 and the spring 69. Before the walls 38 and 39 are secured to the walls 36 and 37 of the U-frame 34, the ball and the spring are inserted into this chamber whose outer end will then be closed by the front wall 36 when the walls 38 and 39 are secured to the frame 34, the wall 36 thus forming the outer abutment for the spring.

Referring to Figures 1 and 2, the switch unit is entirely concealed by the instrument panel with the exception of the button 56. The steering lock unit is also in greater part concealed behind the instrument panel with only the end of the lock barrel visible at the front of the panel for insertion of the key for operation of the locking bolt. I have shown interlocking connection between the steering lock unit and the switch unit for preventing pulling out of the switch button for connection of the ignition circuit with the battery when the locking bolt is set for steering lock, but to release the switch for connecting the ignition circuit with the battery when the steering lock bolt is set for unlocking the steering, interconnection furthermore preventing resetting, the interconnection furthermore preventing resetting of the lock bolt to steering locking position until the button 56 has been pushed in for disconnection of the ignition circuit from the battery. The interlocking connection includes a rigid endwise movable link or bar 74 which, as shown, may be of rectangular cross section and given a quarter twist 75. At its left end the bar is received in a diametral slot 76 in the outer end of the bolt 20 and is pivoted to the bolt by a pin 77. A short distance away from the pivot 77, a washer 78 on the bar is backed by a pin 79, and a spring 80 surrounds the bar between the washer and the end of the bolt 20, this spring tending to hold the bar against rattling.

At its right end the bar 75 extends through a guide opening 81 in the wall 39 of the switch structure to be disposed in front of the arm 53 of the lever 51 which is operated by the button 56. In its rear edge the bar has the notch 82 which, when the bar is shifted toward the right by the outward movement of the lock bolt 20 to unlock the steering, will be in front of the lever arm 53 so that the button 56 may now be pulled out for setting of the switch for service connection of the ignition with the battery. So long as the switch button stays out for connection of the ignition in circuit, the lever arm 53 will remain in the notch and the steering lock bolt will be held against shift into steering locking position. However, as soon as the button 56 is pushed in and the ignition switch has disconnected the ignition circuit from the battery, the bar 74 will be released from the lever arm 53 and the lock may be set into steering lock position, and the solid part of the bar 74 to the right of the notch 82 will then be in front of the lever arm 53 so that the button 56 is locked against outward pull and the switch S is locked in ignition circuit disconnect position, as shown in Figures 2 and 3.

The switch unit may be set on the instrument panel any distance away from the steering locking unit to permit ready grouping of the switch button or knob 56 with other manual controls on the instrument panel. The interlocking link or bar 74 may be given the necessary length and shape for interlocking connection thereof with the remotely situated switch unit, the hinged connection between the link and the lock bolt assuring easy movement of the link in response to setting of the lock bolt into steering locking or unlocking position. The lock bolt 20 may be sufficiently rotatable in the bore 19 for cooperation of such rotary movement with the connection of the bolt with the link to assure free cooperation of the outer end of the link with the switch unit.

The subject matter of this application has been divided from my copending application, Serial No. 560,502, filed October 26, 1944, Patent No. 2,412,752, dated December 17, 1946.

I have shown a practical and efficient embodiment of the features of my invention, but I do not desire to be limited to the exact construction, arrangement or operation shown and described as changes and modifications may be made without departing from the scope of the invention as defined in the appended claims.

I claim as my invention:

1. A steering and ignition locking assembly for automotive vehicles comprising a locking unit on the vehicle steering column behind the instrument panel having an axially shiftable locking bolt for locking engagement with the steering shaft and with a key-operated lock controlling the shifting of said bolt, a switch unit mounted behind the instrument panel remote from the locking unit and comprising a switch operating lever assembly manually operable by a control member accessible from the front of the instrument panel, said locking bolt having a slot in its outer end, an interlocking bar pivoted in said slot, said switch unit having a guide passageway through which the free end of said bar extends, said bar being disposed to move in front of said lever assembly and having a notch, said bar being set in said guide opening to bring a solid portion thereof into the path of said lever assembly upon longitudinal shift of said bar when said locking bolt is set into steering locking position whereby said switch unit will then be locked against switch closure, said notch being exposed to said lever assembly upon shift of said bar when said locking bolt is shifted to steering unlocking position whereby said lever assembly may then be operated for switch closure, said lever assembly when engaging in said notch locking said bar to prevent shift of the lock bolt into steering locking position until said lever assembly is operated for switch reopening by withdrawal of the lever assembly from said notch.

2. A steering post and ignition locking assembly for automotive vehicles comprising an ignition switch including an oscillatable lever, means operable by oscillation of said lever for opening and closing a circuit, manually operable means for oscillating said lever, a steering post lock including a slidable locking bolt, key-operated means for sliding the bolt, a bar hingedly connected to one end of said bolt for endwise movement with it but not with respect to it and having a part lying in the path of oscillation of said lever, said bar having a notch in said part movable by actuation of said bolt into and out of register with said oscillatable lever, the construction being such that when the bolt is in locking engagement with the steering post the bar notch is away from the lever blocking its swing in circuit closing direction and when the bolt is in unlocked position the notch is in front of the lever to allow its swing, the presence of the lever in the notch preventing movement of the bolt into locking engagement until the lever is swung to open the circuit thereby controlled.

3. In a lock, the combination with an operating member, of a bolt movable into engagement with said member to oppose operation thereof, a switch for opening and closing an electric circuit having a manually movable oscillatable notched lever, and a rigid rod separate from and hinged at one end to said bolt for endwise movement with said bolt across the notches in said lever to block and unblock the oscillation of said lever.

4. In a lock, the combination with an operating member, of a bolt movable into engagement with said member to oppose operation thereof, a remotely disposed and separated switch for opening and closing an electric circuit, said switch having a manually movable oscillatable lever, a rigid bar separate from and hinged at one end to said bolt for endwise movement with said bolt across the oscillating path of said lever to block and unblock said lever, and a switch box for said switch having means for guiding said bar with respect to said lever.

5. A locking assembly for an automotive vehicle, comprising a steering post lock mounted behind and concealed by the instrument board with only the end of a member having a key slot in it visible through the instrument board, ignition switch mechanism mounted behind and concealed by the instrument board, a push-pull actuator extending through the instrument board and having a knob on its outer end, an endwise movable rigid member disposed behind the instrument board operatively connected at one end with said steering post lock and at the other end engaging said actuator, said rigid member being movable out of engagement to allow movement of said actuator to close the ignition circuit when the steering post is unlocked and movable into engagement to prevent movement of the actuator when the post is locked, the actuation of a key in said slot constituting means for locking and unlocking the post lock and for moving said rigid member.

6. Automotive vehicle ignition switch mechanism including a push-pull actuator, a lever connected to said actuator to oscillate, a swingable member operated by oscillation of said lever to open and close the ignition circuit, a steering post lock including a sliding bolt, means for sliding said bolt into and out of locking engagement with a steering post, and a rigid bar hinged to said bolt and movable across the path of oscillation of said lever to block such oscillation when said post is locked by said bolt, said bar having a notch in it to receive said lever when the bolt is free of the post to thereby allow oscillation of the lever by said actuator to close the ignition circuit.

RAY A. SANDBERG.

REFERENCES CITED

The following references are of record in the file of this patent:

UNITED STATES PATENTS

| Number | Name | Date |
|---|---|---|
| 1,746,214 | Davidson et al. | Feb. 4, 1930 |
| 1,838,891 | Van Sickel | Dec. 29, 1931 |
| 1,917,593 | Mabee | July 11, 1933 |
| 2,203,949 | Edwards | June 11, 1940 |
| 2,314,568 | Wharam | Mar. 23, 1943 |